United States Patent [11] 3,542,378

[72] Inventor Herbert F. Prasse
 Town and Country, Missouri
[21] Appl. No. 715,354
[22] Filed March 22, 1968
[45] Patented Nov. 24, 1970
[73] Assignee Ramsey Corporation
 St. Louis, Missouri
 a corporation of Ohio

[54] KEYSTONE MULTIPIECE OIL CONTROL RING
 6 Claims, 6 Drawing Figs.
[52] U.S. Cl. ................................................ 277/139,
 277/143, 277/171
[51] Int. Cl. ................................................ F16j 9/06
[50] Field of Search ........................................ 277/139-
 —141, 143, 168—171, ATD

[56] References Cited
 UNITED STATES PATENTS
1,814,355 7/1931 Williams...................... 277/171X
3,004,811 10/1961 Mayfield ...................... 277/139
3,261,612 7/1966 Games......................... 277/139X
 FOREIGN PATENTS
 447,130 4/1949 Italy ............................. 277/139

Primary Examiner—Laverne D. Geiger
Assistant Examiner—Jeffrey S. Mednick
Attorney—Hill, Sherman, Meroni, Gross & Simpson ABSTRACT: A keystone ring groove and multipiece side-sealing piston ring assembly effective to minimize high mileage sticking in internal combustion engine installations. The piston has an oil ring groove with diverging sidewalls receiving in sealed relation therewith a pair of thin rails or ring segments supported on a spacer-expander ring therebetween. The spacer-expander ring dishes the rails or ring segments and loads them in side sealing engagement with the diverging sidewalls while at the same time radially expanding the rails into sealed engagement with the wall of the cylinder in which the piston operates.

Patented Nov. 24, 1970
3,542,378
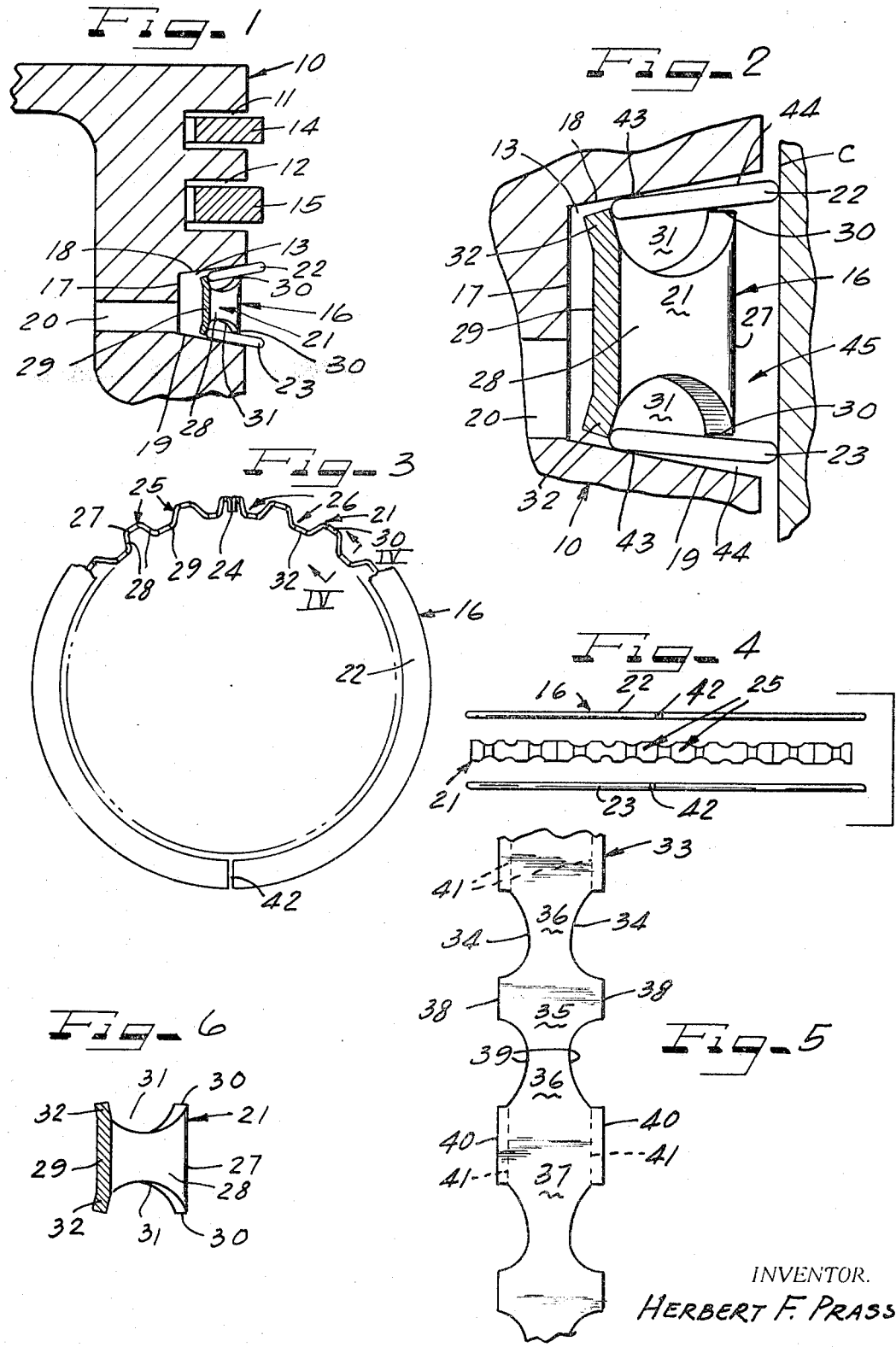
INVENTOR.
HERBERT F. PRASSE
BY Hill, Sherman, Meroni, Gross & Simpson ATTORNEYS

KEYSTONE MULTIPIECE OIL CONTROL RING

BACKGROUND OF THE INVENTION

1. Field of the Invention

This invention pertains to piston and ring assemblies, particularly for internal combustion engine installation.

According to this invention, the piston is provided with a keystone oil control ring groove receiving a multipiece oil control ring assembly in side-sealing relation with the diverging sidewalls of the ring groove.

The purpose of the invention is to eliminate or minimize the sticking of side sealing oil control rings in piston ring grooves.

2. Description of the Prior Art

Multipiece side-sealing oil control rings are disclosed and claimed in the Melvin W. Marion, U.S. Pat. No. 2,817,564 granted Dec. 24, 1967. Such ring assemblies, while performing better than other oil control rings are now causing serious problems due to sticking of the assembly in the ring groove. This sticking is caused by lacquer buildup between the sidewalls of the ring groove and the rail ring or ring segments of the assembly. With the higher mileage warranties being offered in the automobile industry, the higher temperatures caused by high compression ratios of the engine, and the emission controls of the engine exhaust system, the oil control ring sticking problem has become quite acute in the automotive industry.

The present invention now completely prevents or substantially minimizes this oil control ring sticking problem.

SUMMARY

It has now been found that if the side-sealing contact of the rails or ring segments of a multipiece side-sealing oil control ring assembly is against the radially outwardly diverging sidewalls of a ring groove and the rails of the ring segments are dished and loaded by the spacer-expander ring so as to diverge in the same direction as the sidewalls, the lacquer buildup between the rails and sidewalls which causes sticking will be prevented. This is probably due to a free sliding angled contact between the rails and the sides of the ring groove coupled with a free draining gap between the rails and sidewalls. While it was heretofore deemed necessary to load the rails or ring segments against a radial sidewall in order to develop an effective seal, contrary to expectations, satisfactory sealing loads can be maintained against diverging sidewalls if the spacer-expander dishes the rails or ring segments so as to diverge from their inner to their outer peripheries instead of to converge as in the prior art. The converging rings of the prior art provided wedging gaps which trapped engine deposits and permitted lacquer buildup while the flat angle sealing contact between the rings and the radial sidewalls afforded no slip face for breaking up the lacquer deposite.

It is then an object of the invention to provide a keystone ring groove and side-sealing piston ring assembly which will substantially eliminate the sticking problems heretofore encountered with oil control rings.

Another object of the invention is to provide a keystone groove oil control ring preventing high mileage sticking which has rail rings diverging in the same direction as the sidewalls of the keystone groove.

Another object of the invention is to provide a three-piece type oil control ring with diverging ring segments for use in keystone ring grooves.

A specific object of the invention is to provide a three-piece nonsticking oil control ring having a spacer-expander with fulcrum supports around its outer periphery and angled tabs around its inner periphery coacting with the fulcrum supports to dish rail rings carried thereon into diverging relation for side-sealing engagement with the diverging sidewalls of a keystone ring groove.

A specific object of the invention is to provide a three-piece oil control ring assembly having a radially corrugated spacer-expander with humps having outer peripheral portions providing fulcrum supports for ring segments and axially outward and radially inwardly diverging tabs around its inner periphery for engaging the inner peripheries of the ring segments on the fulcrum supports to dish the ring segments in diverging relation for coaction with the diverging sidewalls of a keystone ring groove.

Other further objects and features of this invention will become apparent to those skilled in this art from the following detailed description of the annexed sheet of drawing.

BRIEF DESCRIPTION OF THE DRAWING

FIG. 1 is a fragmentary vertical cross-sectional view of the ring band area of an internal combustion engine piston having a keystone ring groove and an oil control ring assembly of this invention.

FIG. 2 is a fragmentary vertical cross-sectional view of the keystone ring groove and oil control ring assembly of FIG. 1 showing the same on an enlarged scale with the ring assembly compressed by the engine cylinder wall.

FIG. 3 is a plan view of the ring assembly with a portion broken away to show the spacer-expander.

FIG. 4 is an outside peripheral view of the ring assembly with the components separated.

FIG. 5 is a fragmentary elevational view of the metal blank strip from which the spacer-expander is formed.

FIG. 6 is an enlarged cross-sectional view taken along the line VI-VI of FIG. 3.

DESCRIPTION OF THE PREFERRED EMBODIMENTS

The piston 10 of FIG. 1 has a top ring groove 11, a middle ring groove 12, and a keystone oil ring groove 13. A conventional split solid cast iron piston ring 14 is mounted in the top groove 11, a conventional split cast iron compression ring 15 is mounted in the middle groove 12 and the three-piece side-sealing oil control ring 16 of this invention is mounted in the keystone groove 13.

The keystone ring groove 13 has an axially extending backwall 17, a radially outward and axially upwardly inclined top sidewall 18 and a radially outward and axially downwardly inclined bottom sidewall 19. Oil drainage holes such as 20 extend from the backwall 17 to the interior of the piston for insuring free flow of oil through the oil groove 13.

The oil control ring assembly 16 of this invention includes a spacer-expander ring 21, a top rail ring or ring segment 22 and a bottom rail ring or ring segment 23. The spacer-expander 21, as shown in FIGS. 3 and 4, is a radially corrugated sheet steel split ring with abutted together ends 24, a plurality of circumferentially spaced humps 25 and outwardly opening pockets 26 between the humps 25. The humps 25 are each composed of in outer face or leg 27 and a pair of side legs 28 diverging radially inward and circumferentially outward from the legs 27, to backwalls on legs 29 at the bottoms of the pockets and connecting the side legs in circumferentially spaced relation. The ring 21 is spring hardened and when its ends are abutted together at 24 it forms a circumferential spring when radially compressed, the spring effect being accommodated by flexing of the legs 28.

The front walls or legs 27 of the humps have top and bottom edges 30 providing fulcrum supports for the rail rings as will be more fully described hereinafter. The side legs 28 converge axially from the edges 30 to reduced thickness midpoints and then diverge axially to the axial ends of the back legs 29. This provides gaps or spaces 31 axially inward from the edges of the ring. The axial outer ends of the inner legs 29 have angled tabs 32 sloping axially outwardly and radially inward therefrom to engage the inner peripheries of the rails 22 and 23 when these rails are supported on the fulcrum points 30 as will be more hereafter described.

As shown in FIG. 5, the spacer-expander 21 is formed from a steel ribbon or strip 33 which is cut along its side edges to provide the areas for forming the legs and supporting edges when the strip is corrugated. Thus, the blank 33 has sequentially spaced cutouts 34 along its length shaped to provide front leg forming portions 35, side leg forming portions 36 and rear leg forming portions 37. The front leg portions 35 have side edges 38 which provide the fulcrum supports 30 in the finished ring and the side leg portions 36 have curved side edges 39 which provide the reduced thickness midpoint for the legs and also provide the drainage openings 31. The side edges 40 of the portions 37 extend the full length of the portions 37 but could, of course, be of lesser length. These portions are bent along the dotted lines 41 to form the inclined tabs 32.

The rails 22 and 23 are thin flat steel ring with gaps 42 between their split ends. The split rails are thus radially expansible by the spacer-expander as hereinafter more fully explained. The rails may have rounded inner and outer peripheries and the outer peripheries can be coated with a hard facing metal such as chromium, if desired.

When the oil control ring assembly 16 of this invention is seated in the keystone groove 13 of the piston 10, the rails 22 and 23 will rest on the edges 30 of the humps 25 while the inner peripheries of the rails will be engaged by the tabs 32. The angle of inclination of the tabs and the position of the edges 30 which form fulcrum supports for the rails, will cause the rails to dish from their free-state flat condition to a sloping conical state where the outer periphery is axially outward from the inner periphery. Thus, the rail rings slope axially outwardly from their inner to their outer peripheries. At the same time, the rails are forced into side sealing engagement with the sidewalls 18 and 19 of the keystone groove at sealing zones or areas 43 close to the inner peripheries of the rails.

When the piston and rings are mounted in a cylinder C, as shown in FIG. 2, the assembly 16 is forced deeper into the ring groove 13 to compress the spacer-expander 21 and causing it to exert circumferential expansion force on the rails 22 and 23 which holds their outer peripheries in sealing engagement with the cylinder wall. Thus, in the operating position of the assembly 16 as shown in FIG. 2 the rails 22 and 23 are supported at the fulcrum points 30 of the spacer-expander 21 and project radially inward from these points to the angled tabs 33 which engage the inner peripheries of the ring. The fulcrum arm length between the support 30 and the angle tab 32 is the major portion of the radial depth of the rail. The remaining portion of the radial depth of the ring which projects beyond the fulcrum support 30 extends outwardly from the groove 13 to seal the gap between the piston 10 and its cylinder C. The angle tabs 32 exert not only a radial outward but also an axial outward load on the rails 22 and 23 to maintain the sealing areas 43 with the sidewalls of the keystone groove while also maintaining the sealing engagement of the outer peripheries of the rails with the cylinder wall.

Outwardly opening gaps 44 as shown in FIG. 2 are provided between the rails and the sidewalls of the keystone groove and these gaps converge to the side-sealing areas 43. Because the rails 23 are dished and thus have conical or sloping sidewalls and because the sidewalls of the keystone groove are also sloping, the gaps 44 are relatively free draining and contaminants will not be drawn therein to build up deposits which can cause sticking.

Since the sealing zones 43 are against diverging sidewalls of the keystone groove, the sealing load is on a self-cleaning sloping surface which will prevent lacquer buildup. The diverging condition of the dished rails 22 and 23 and the diverging sidewalls 18 and 19 of the ring groove thus cooperate to eliminate or minimize sticking of the ring assembly 16 in the ring groove. A preferred range of angles for each sidewall 18 and 19 is 2° to 10° from the radial (4° to 20° included angle). The rails 22 and 23 are dished to about the same angle as the sidewalls 18 and 19, the angle of dish being only slightly less (about 1° less) than the angle of the sidewalls.

The angle of the tabs 32 may vary to vary the side-sealing load. A preferred range of angles is 2° to 23° from the vertical and a preferred angle is about 15 degrees. Likewise, the height of the fulcrum support areas 30 may vary but the relationship of the fulcrum supports and the angle tabs is controlled to insure the outward dishing of the rails causing them to follow the outward slope of the keystone sidewalls. Then the assembly is mounted for operation as shown in FIG. 2, the zone of the cylinder wall between the rails 22 and 23 as illustrated at 45 is in free-draining relation with the oil drainage holes such as 20 of the piston, since as indicated the spacer-expander 21 provides sufficient openings 31 to insure each communication. This spacer may be replaced with other types of spacer-expanders accommodating oil drainage and providing fulcrum supports and side-sealing load forces for the rails.

From the above description, it will therefore be clear that this invention provides a combination of an oil control ring assembly and a ring groove which practically eliminates sticking heretofore encountered in oil control ring assemblies.

Although I have herein set forth my invention with respect to certain specific principles and details thereof, it will be understood that these may be varied without departing from the spirit and scope of the invention as set forth in the hereunto appended claims.

I claim:

1. An oil control ring assembly for keystone piston ring grooves which comprises a pair of thin rail rings, a spacer-expander ring between said rail rings providing fulcrum supports for the rail rings near their outer peripheries, angled tabs on the inner periphery of the spacer-expander ring engaging the inner peripheries of said rail rings, the angle of inclination of said tabs and the position of said fulcrum supports being so correlated as to dish said rail rings to a sloping, conical state where the outer periphery of each rail ring is axially outward from the inner periphery thereof, said spacer-expander ring urging the inner peripheries of the rail rings against the sides of the ring groove to form seals at the inner peripheries of the rail rings, and said assembly providing free-draining gaps between the rail rings and sidewalls of the ring groove from said seals to the outer periphery of the ring groove, with the outer ends of said gaps being axially outward from the inner ends thereof to ensure free draining and prevent buildup of contaminants which might cause sticking of the assembly to the ring groove.

2. An oil control ring assembly for use in keystone piston ring grooves having diverging sidewalls which comprises a pair of rail rings, a spacer-expander ring between said rail rings supporting and dishing said rail rings into diverging relation, with the outer peripheral portions of the ring being axially outward from the inner peripheral portions of the rings, said spacer-expander loading the inner peripheral portions of the rail rings against the diverging sidewalls of the ring groove to form seals, and said spacer-expander supporting the outer peripheral portions of said rail rings inwardly from the sidewalls of said groove to provide outwardly opening and diverging gaps between the rail rings and the sidewalls of the ring groove extending continuously from the seals provided against the ring groove by the inner peripheral portions of the rail rings, and increasing in height from the inner to the outer ends to ensure free draining of contaminants therefrom.

3. The oil control ring assembly of claim 1 wherein the spacer-expander is a radially corrugated metal ring having humps providing the fulcrum supports for the rail rings and wherein the angled tabs are radially inward from said humps for engaging the inner peripheries of the rail rings to cooperate with the humps for dishing the rail rings to slope axially and radially outward from their inner peripheries.

4. The assembly of claim 1 in combination with a piston having a keystone piston ring groove receiving the assembly wherein the sidewalls of the ring groove each diverge at an angle of from 2° to 10° from the radial plane.

5. The assembly of claim 1 wherein the angle of the dished rail rings is about 1° less than the angle of the sidewalls of the keystone ring groove.

6. The assembly of claim 1 wherein the angle of inclination of the tabs is from 2° to 23° from the vertical.